Aug. 28, 1928.

A. CORONA

TRACTOR ATTACHMENT

Filed Dec. 4, 1926

1,682,717

WITNESSES

INVENTOR
ARTHUR CORONA
BY
ATTORNEY

Patented Aug. 28, 1928.

1,682,717

UNITED STATES PATENT OFFICE.

ARTHUR CORONA, OF BROOKLYN, NEW YORK, ASSIGNOR OF ONE-HALF TO NATHAN HIRSCH, OF NEW YORK, N. Y.

TRACTOR ATTACHMENT.

Application filed December 4, 1926. Serial No. 152,639.

This invention relates to tractor attachments and more particularly to such an attachment designed for use in connection with automobile trucks and the like, an object of the invention being to provide a tractor attachment which can be brought into operation when the truck is stuck in the mud or in a hole, and will function to propel the truck onto the solid ground.

A further object is to provide a tractor attachment which may be secured to any vehicle, which is normally out of operation and normally elevated so as to be out of contact with the ground, but which can be adjusted so as to lower the same into operative position and caused to operate to propel the vehicle.

A further object is to provide an attachment of the character stated, in which the traction is caused by a plurality of movable feet which engage the ground in succession, very similar to the movement of human feet in walking, so as to propel the vehicle as far as may be desired, relieving the driving wheels temporarily of their function.

With these and other objects in view, the invention consists in certain novel features of construction and combinations and arrangements of parts, which will be more fully hereinafter described and pointed out in the claim.

In the accompanying drawings—

Figure 1:
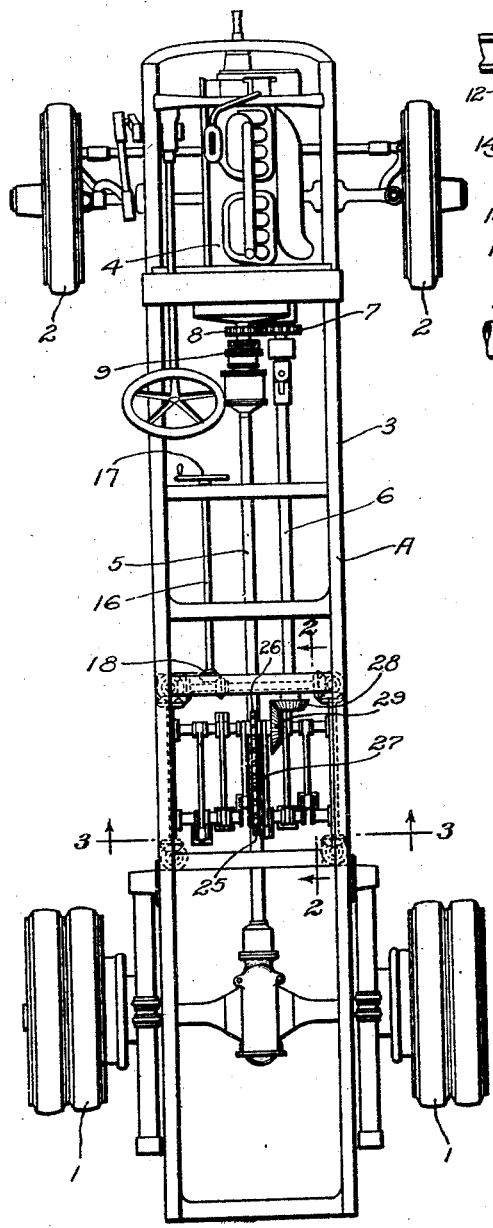
Figure 1 is a plan view of a truck equipped with my improved tractor attachment, all superstructure such as the body, etc., being omitted for clearness.

A represents a truck or other vehicle but for the purposes of invention we will assume that this is a motor truck of standard type, having traction wheels 1, 1 at the rear thereof, which together with steering wheels 2 at the front support the chassis 3, engine 4 and other elements of the truck construction.

5 represents the drive shaft operatively connecting the engine with the rear axle, and 6 is a shaft extending longitudinally of the chassis, substantially parallel to the shaft 5, and operatively connected to said shaft by intermeshing gears 7 and 8.

9 represents what may be assumed to be a clutch or other means which locks the gear wheel 8 to the shaft 5 and releases the same therefrom, and this means is in convenient reach of the driver so that it is always under his control, as may be necessary.

10 represents a vertical movable frame which carries my improved tractor mechanism and is located below the chassis 3 and as near the rear axle as possible. This frame 10 is supported by a number (preferably four) of vertically disposed screws 11, which at their upper ends have swivelled connection with the chassis, as indicated at 12.

Bevel pinions 13 are secured on the screws 11, and all of the bevel gears 13 are in mesh with companion bevel gears 14 on shafts 15, so that all of the screws are turned simultaneously and in the same direction when the said gears are in motion to raise and lower the frame 10, as will be readily understood.

16 represents a shaft operated by a handwheel 17 and connected by a bevel gear 18 with one of the bevel gears 13, so that motion is manually imparted to said gears at the will of the operator to raise and lower the frame 10 to move the tractor mechanism into and out of operative position, it being understood of course that during the normal operation of the truck this frame 10 will be elevated so that the tractor mechanism is out of contact with the ground.

The frame 10 supports a pair of parallel crank shafts 19 and 20, and while I have shown each of these shafts as provided with six crank arms arranged in two sets disposed at an angle of 120° to each other it is obvious that I may employ any number of crank arms in accordance with the number of tractor elements desired and which will be more fully hereinafter described in detail.

The shaft 6 above referred to is operatively connected to the shaft 19 through the medium of bevel gears 28 and 29.

I would call attention to the fact that the crank arms of shaft 19 have a 60° advance in position over the crank arms of shaft 20.

Links 21 are pivotally connected at their upper ends to the crank arms of shaft 20 and support at their lower ends ground contacting feet 22, which may have any desired length and width of base in order to give any desired bearing on the ground.

These feet 22 are connected to the links 21 by pivots 23, and said pivots 23 also function to couple the lower ends of links 24 to said links 21 and feet 22. The other ends of these links 24 are pivotally connected to the crank arms of shaft 19.

Sprocket wheels 25 and 26 are connected by a sprocket chain 27 so as to compel the shafts 19 and 20 to operate at the same speed and move in unison. It is of course to be understood that other forms of power transmission may be employed between the respective shafts but I have illustrated a chain, which will answer the purpose.

Figure 2:
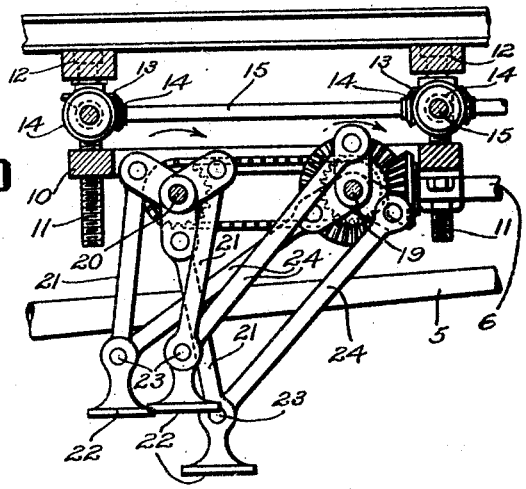
Figure 2 is a view on an enlarged scale on the section line 2—2 of Figure 1.
Figure 3:
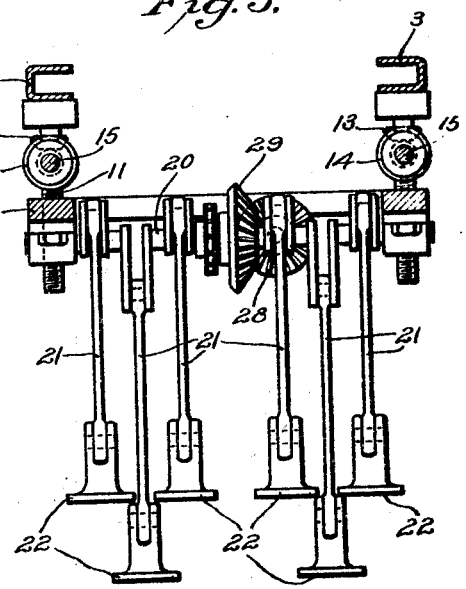
Figure 3 is a view similar to Figure 2, taken on the section line 3—3 of Figure 1, transversely of the truck.

The operation is as follows:

Normally the frame 10 is in its elevated position and my improved tractor mechanism is out of operation. When the truck becomes stuck in the mud or in a hole, or for any other reason it is desired to employ my improved tractor mechanism, the operator stops the engine or motor of the truck and then by manually manipulating the handwheel 17 turns the shaft 16 and through the medium of the bevel gears and shafts above described he causes the screws 11 to turn to lower frame 10 to operative position. He then throws the clutch 9 to lock the gear 8 to the drive shaft of the truck motor and starts the motor. Power is then transmitted through the gears 8 and 7 to the shaft 6, and through the arrangement of gears and sprocket chain above described the shafts 19 and 20 are caused to turn in the direction of the arrows indicated in Figure 2. The crank arms of shaft 20 give to the feet 22 an up and down movement, and the crank arms of shaft 19 through the medium of the links 24 give to the feet a somewhat rotary movement which, due to the arrangement of linkage, is very similar to the action of the human feet in walking. In other words, one of these feet 22 is always in contact with the ground, and as downward pressure thereon is imparted the rear end of the truck is elevated and caused to move forward and before one foot leaves the ground another foot 22 comes in contact therewith and the operation is repeated in a continuous succession of ground engagements of the several feet to propel the vehicle forwardly and at the same time give a slight shifting action to the rear end of the truck to move the same out of its predicament, and when the rear traction wheels are on solid ground the tractor attachment is stopped and the frame 10 elevated so that the truck is ready to proceed as before.

By reason of an attachment of this kind, the use of a truck can be continuous without being tied up for long periods due to the bad road conditions and other causes where assistance is necessary, as my improved attachment provides a very ready means for aiding the truck in traction difficulties.

While I refer to this device as a truck, it is obvious that my invention is applicable to any vehicle and might be used on cars of any type. It is also to be understood that I do not limit myself to the proportions of the several parts for, as a matter of fact the feet 22 should have a bearing surface or base as long or as wide as possible within reasonable limits to give as large an extended bearing as is possible on the ground.

The correct motion of the feet is had by reason of the fact that crank arms of shaft 19 are 60° in advance of the crank arms of shaft 20, and while this matter of degrees is only proportionate I believe 60° in advance is the proper proportion but do not wish to be limited specifically to this.

Various changes and alterations might be made in the general form of the parts described without departing from my invention and hence I do not limit myself to the precise details set forth but consider myself at liberty to make such changes and alterations as fairly fall within the spirit and scope of the appended claim.

I claim:

A tractor attachment, including a support, a pair of crank shafts adapted to turn in the same direction, links pivotally connected to the crank arms of one of said shafts, feet pivotally connected to the lower ends of said links, having extended ground-engaging portions, and other links connecting the crank arms of the other shaft, with their feet at the point of pivotal connection with the first-mentioned links.

ARTHUR CORONA.